(12) United States Patent
Condit

(10) Patent No.: US 7,704,399 B2
(45) Date of Patent: Apr. 27, 2010

(54) HYDROGEN PEROXIDE BASED WATER TREATMENT METHOD

(76) Inventor: Randy Gene Condit, RR 3, Box 1405, Chandler, OK (US) 74834

( * ) Notice: Subject to any disclaimer, the term of this patent is extended or adjusted under 35 U.S.C. 154(b) by 432 days.

(21) Appl. No.: 11/807,792

(22) Filed: May 30, 2007

(65) Prior Publication Data

US 2007/0256979 A1    Nov. 8, 2007

Related U.S. Application Data

(63) Continuation-in-part of application No. 11/151,993, filed on Jun. 14, 2005, now abandoned.

(60) Provisional application No. 60/579,888, filed on Jun. 15, 2004.

(51) Int. Cl.
C02F 1/28       (2006.01)
C02F 1/56       (2006.01)
C02F 1/76       (2006.01)

(52) U.S. Cl. .............. 210/666; 210/667; 210/668; 210/694; 210/714; 210/715; 210/721; 210/725; 210/727; 210/752; 210/754; 210/764

(58) Field of Classification Search .............. 210/721
See application file for complete search history.

(56) References Cited

U.S. PATENT DOCUMENTS

| | | | | |
|---|---|---|---|---|
| 2,382,490 A | * | 8/1945 | Lawlor | ........................ 210/715 |
| 3,403,096 A | * | 9/1968 | Mackrle et al. | ............. 210/709 |
| 4,219,418 A | * | 8/1980 | Pilon | ........................... 210/717 |
| 4,786,418 A | | 11/1988 | Garg | |
| 5,043,080 A | | 8/1991 | Cater | |
| 5,154,834 A | * | 10/1992 | Vande Venter | ............... 210/666 |
| 5,314,629 A | * | 5/1994 | Griese et al. | ................. 210/754 |
| 5,716,528 A | | 2/1998 | Jasim | |
| 5,817,240 A | | 10/1998 | Miller | |
| 5,914,040 A | | 6/1999 | Pescher | |
| 6,024,882 A | | 2/2000 | McNeilly | |
| 6,190,561 B1 | * | 2/2001 | Nagan | ......................... 210/665 |
| 6,447,686 B1 | * | 9/2002 | Choi et al. | ................... 210/666 |
| 6,582,605 B2 | | 6/2003 | Krulik | |
| 6,596,176 B1 | | 7/2003 | Delozier, II | |
| 6,663,781 B1 | | 12/2003 | Huling | |
| 6,716,354 B2 | * | 4/2004 | Rosenblatt et al. | ........... 210/638 |
| 6,863,826 B2 | | 3/2005 | Sheets | |
| 7,008,543 B2 | * | 3/2006 | Newkirk et al. | .............. 210/667 |
| 7,311,841 B2 | * | 12/2007 | Binot et al. | .................. 210/666 |

* cited by examiner

*Primary Examiner*—Peter A Hruskoci
(74) *Attorney, Agent, or Firm*—Randal D. Homburg

(57) ABSTRACT

A system and method for the treatment of water for human consumption using a naturally occurring inorganic catalyst working within a pH range between 3 and 13, combining the inorganic catalyst at 3 parts per million to an oxidant, primarily hydrogen peroxide and a metal salt used as a coagulant and a primary catalyst, resulting in an efficient and economical phasic water purification and filtration system and process. The inorganic catalyst is a zeolite a synthetic zeolite or preferably chabazite.

16 Claims, 8 Drawing Sheets

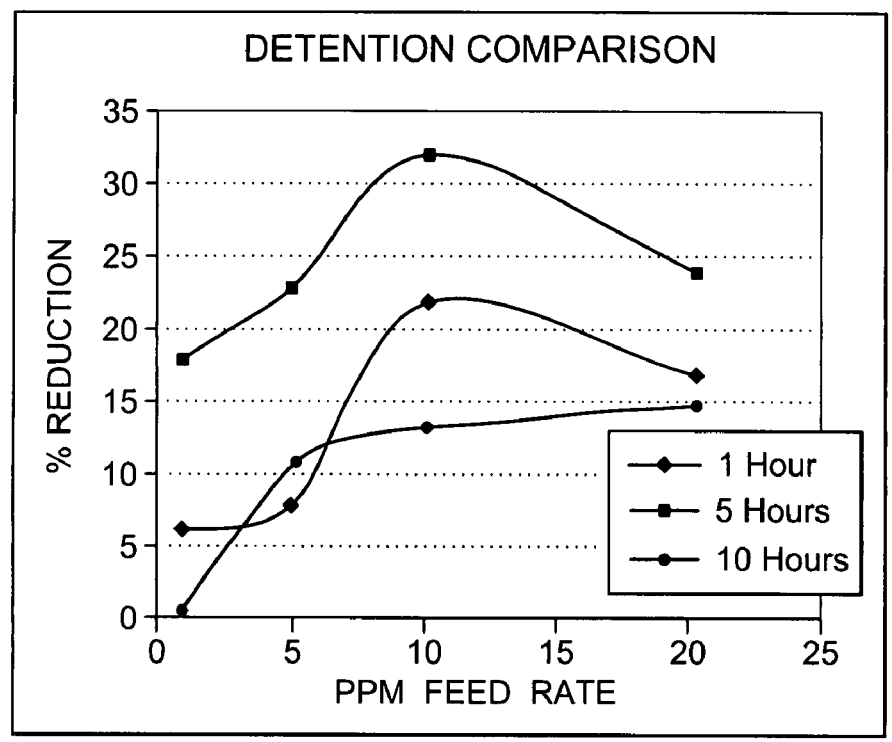
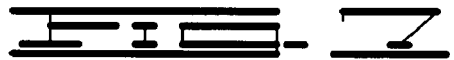
FIG. 7
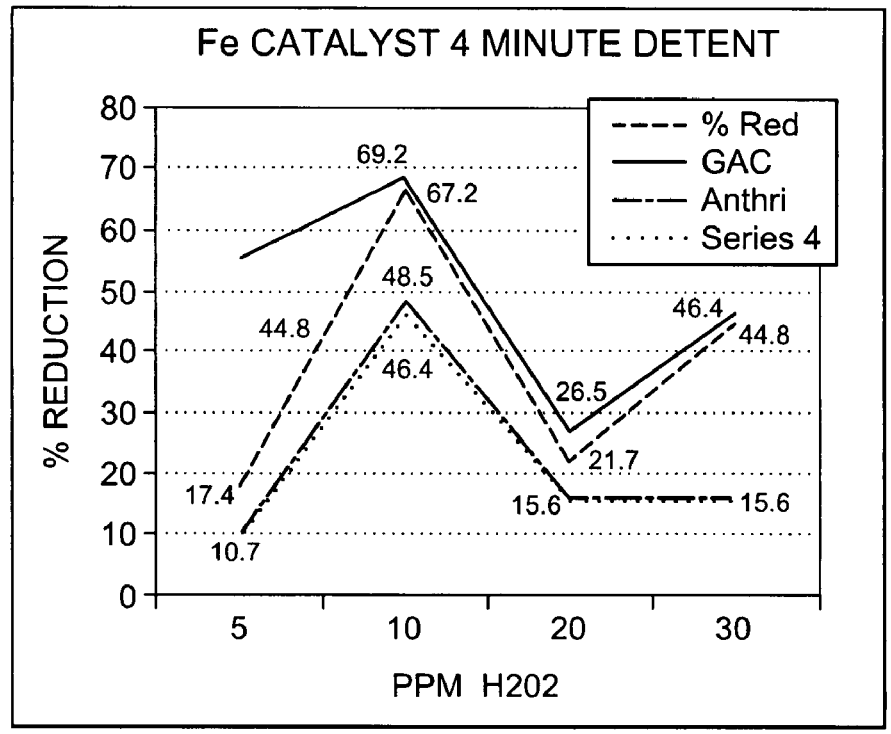
FIG. 8

HYDROGEN PEROXIDE BASED WATER TREATMENT METHOD

CROSS REFERENCE TO RELATED APPLICATIONS

This is a Continuation-In-Part Application of U.S. Non-Provisional patent application Ser. No. 11/151,993, filed on Jun. 14, 2005, now abandoned by the same inventor, said prior application claiming the benefit of Provisional Patent Application Ser. No. 60/579,888, filed on Jun. 15, 2004, now abandoned.

I. BACKGROUND OF THE INVENTION

1. Field of Invention

A system and method for the treatment of water for human consumption using a naturally occurring inorganic catalyst working within a pH range between 3 and 13, combining the inorganic catalyst at 3 parts per million to an oxidant, primarily hydrogen peroxide and a metal salt used as a coagulant and a primary catalyst, resulting in an efficient and economical phasic water purification and filtration system and process.

2. Description of Prior Art

Over the last several years, governmental agencies have elevated standard with regard to water quality for treated water supplied by municipal, rural water district and other filtered or treated water sources. Because a very small number of water sources are clean enough for human consumption, nearly all water treatment required falls within these standards, including clarification, disinfection, decontamination, sanitation, chemical treatment, and is the subject of scrutiny for many environmental agencies and watchdog groups.

The primary purpose of water treatment is to remove contaminants from water originating from natural sources where organic compounds and microorganisms must be removed before being fit for human consumption. Often these compounds cause foul odors and unappealing discoloration of the water, but more concerning are the microorganisms, organic compounds and carcinogens which may cause illness, disease or decaying health to the consuming public.

Prior art has abundantly addresses systems and methods used to remove organic contaminants from water sources and from recycled water. Most prominent is chlorination, wherein chlorine is added to water in gaseous or dry chemical format in most parts of the modern world. However, chlorine has been losing preference in many governmental agencies and health organizations due to concerns for potential adverse health concerns. It has been disclosed that chlorination can lead to the formation of toxic and carcinogenic Disinfection by-Products (DBPs) including chloroform and haloacidic acids. The use of chlorine by water treatment plants is also becoming more restrictive due to safety concerns with the chlorine gas or dry chemical product and human exposure to these raw chemical used in the present chlorination process as such chemicals can cause death or significant injury in their supplied form.

Alternatively, oxidation is sometimes used to destroy organic contaminants while theoretically leaving behind nothing but a harmless by-product. A popular oxidant is ozone, but an expensive drawback is that it must be produced on site and typically must be created immediately prior to injection into the water for treatment. Further, it requires existing plants to install new and expensive machinery that is not commonly found or used at treatment facilities. Although other oxidants may be used, many result in undesirable DBPs including a suspected carcinogen bromate.

It is also been understood in prior art to use a milder oxidant hydrogen peroxide in water treatment, but in the current art will commonly degrade too rapidly and is insufficient to decontaminate the water by itself. Hydrogen peroxide has also been combined with ozone, UV radiation, filters and some ferrous ions in attempts to boost reactivity and efficiency.

Some of the prior art is disclosed which would be relevant to the field of the current invention process. U.S. Pat. No. 6,024,882 to McNeilly, discloses a method of using a combination of hydrogen peroxide and ozone to decontaminate water. High intensity mixing of the hydrogen peroxide, ozone and water under pressure facilitates the completion of the oxidation with a minimal waste of ozone. However, bromate formation is inhibited by having a hydrogen peroxide greater than the ozone concentration. This patent requires the installation of ozone producing devices and machinery on the premises and close to the injection site in the process.

In U.S. Pat. No. 5,043,080 to Cater, a method of using hydrogen peroxide and metal ions is employed in conjunction with UV radiation. Human exposure to UV radiation can be extremely dangerous and pose serious injury risk to employees at the treatment plants where this is used. U.S. Pat. No. 5,716,528 to Jasim discloses a water treatment method comprising the addition of hydrogen peroxide and ferrous ions at an acidic pH and subsequent filtration through activated carbon. Although this method uses neither chlorine, a strong oxidant, or UV radiation, it requires the installation and use of active carbon filters that require constant cleaning and recharging as well as costly installation.

A method of using hydrogen peroxide enhanced by passing the treated water over a filter or fixed bed after the addition of the hydrogen peroxide is disclosed in U.S. Pat. No. 5,817,240 to Miller. The filter or fixed bed contains metal ions that enhance the activity of hydrogen peroxide. As with the Jasim patent, this method requires the installation of costly filtration systems or additional reservoirs in which fixed beds would have to be installed. Maintenance and initial installation are expensive and may or may not be fitted within the spatial confines of existing treatment plants. U.S. Pat. No. 6,596,176 to Delozier discloses a process for water purification using hydrogen peroxide and metallic coagulants in order to remove organic contaminants, but teaches away from the use of halogens or ferrous ions to treated water, adding the hydrogen peroxide into the system at a first injection point.

In U.S. Pat. No. 6,863,826 to Sheets, a method is disclosed whereby chabazite is used to remove odor from animal waste effluent, but does not disclose this for use in the removal of odor from water, although it might be contended that such use would be obvious to those skilled in the art to use zeolites, including chabazite, for removal of odor from water during a treatment process. However, there is absolutely no mention of converting hog effluent to a consumable water source in any processing mentioned within that patent. It is merely introduced to reduce the rampant odor generated by a pond containing animal urine and feces.

A process for purifying hog manure is disclosed in U.S. Pat. No. 5,914,040 to Pescher et al., which involves a process comprising the step of treating the effluent with at least one chemical oxidizing agent, at least one flocculating agent and at least one polyelectrolyte forming a filtrate cake and a filtrate. Hydrogen peroxide is disclosed as one of the oxidants, while iron salt is mentioned as a cationic flocculating agent, although aluminum and magnesium are also included. Anionic flocculating agents are also mentioned in this patent.

The polyelectrolyte is generally a sugar, which is disclosed as a polyacrylate, a polyacrylamide, a polymethacrylate, a polycarboxylate, a polysaccharide or chitosan. However, no further process is disclosed which is presented in the present process materially similar to the present invention.

Krulik et al., U.S. Pat. No. 6,582,605 also discloses a pretreatment process for treating industrial waste water prior to using conventional filtration, especially for high flow, single pass filters. This patent also uses hydrogen peroxide and iron salts to accomplish this pre-filtration process. The process is materially distinct from the process of the present inventive process with regard to steps and treatment phases which are a complete water treatment process providing a potable water source for human consumption.

II. SUMMARY OF THE INVENTION

In the modern world, many public water suppliers employ water treatment of above ground and underground water supplies prior to delivery to public consumers to remove contaminants which may be harmful for human consumption. Existing water treatment methods and processes use chemicals and filters to accomplish their intended filtration processes. Some newer methods disclose better and more efficient technology to perform their filtrations tasks, but can be costly upgrades to present systems which would require gross adaptation to be adapted to include these new technologies. It would be preferred to provide a simple upgrade to existing systems or to provide an economical new installation water treatment system and method with an improved water filtration capabilities.

The present system and method for the treatment of a water supply to improve safety, reduce cost of installation and operation and ease of implementation. The method comprises applying an metal salt catalyst at a first injection point along a primary delivery line, hydrogen peroxide at a second injection point along the primary delivery line, air at a third injection point to provide a turbidity within the primary water line and to promote oxidation within the primary line if needed, and chlorine dioxide at a fourth injection point. An inorganic catalyst may also be added to the water mixture from the primary transmission line in the form of a natural or synthetic zeolite, such as chabazite, and chlorine may be added to the end point where filtration occurs in place of the chlorine dioxide within the transmission line. The treated water mixture passes into a battery of detention tanks, including a flash mix tank wherein Bentonite clay and/or pulverized activated carbon is added along with a polymer or blend of polymers, if any, before passing to the contactor basin and final filtration before delivery to the consumer. Chlorine or fluoride may also be added to the treated water at the point of filtration if not added at some point within the primary transmission line.

For purpose of this application, several terms are defined within the specification which will be given the meanings as follows:

AA—Atomic absorption spectrophotometer used to determine the concentrations of metal in water and other types of samples.

Catalyst—Any substance of which a fractional percentage notably affects the rate of a chemical reaction, without the substance itself being consumed or undergoing a chemical change. Most catalysts accelerate reactions, but a few actually retard the chemical process and are sometimes referred to as negative catalysts or inhibitors.

Catalyze—To act as a catalyst; to accelerate a chemical reaction.

DOC—Dissolved organic carbon, which is that portion of the organic carbon in water that passes through a 0.45 micrometer pore diameter filter. For most drinking water sources, the dissolved organic carbon fraction represents a very high percentage of the total organic carbon pool. It is composed of individual compounds as well as nonspecific humic materials, although humic substances account for a large portion of dissolved organic matter in natural waters. Typically, the dissolved organic carbon level provided some indication of the amount of disinfection by-product precursors in a water source. After filtration, dissolved organic carbon is determined in the same manner as total organic carbon (TOC, later defined). Organic carbon concentrations should be reported as dissolved organic carbon only if the sample has been filtered through the 0.45 micrometer pore diameter filter prior to analysis.

Fulvic Acid—Aquatic fulvic acid is a complex organic compound of unknown specific chemical structure that leaches from decaying vegetation. Aquatic fulvic acids are the cause of most of the visible brownish color in some waters. These fulvic acids are themselves non-toxic, but are major precursors of disinfection by-products, comprising most of the natural organic matter in water and are lower in molecular weight that aquatic humic acids.

GAC—Granular activated carbon is a form of particulate carbon manufactured with increased surface area per unit mass to enhance the adsorption of soluble contaminants. GAC is used in fixed bed containers in water treatment and is removed and regenerated/reactivated when the adsorption capacity is exhausted. In some applications, GAC can be used to support biological population for stabilizing biodegradable organic material.

HAAs—Haloacetic acid, of the general formula $CX_3COOH$, where X is Cl, Br, H or another halide in various combinations, which is a general class of disinfection by-products formed primarily during the chlorination of water containing natural organic matter. When bromide is present, a total of nine chlorine, chlorine/bromide or bromide substituted species may be formed. Trihalomethanes and haloacetic acids are the two most prevalent classes of by-products formed during chlorination, subject to regulation under the known Disinfectant/Disinfection By-Products Rule.

Humic acid—aquatic humic acid, which is another complex organic compound of unknown specific structure that leaches from decaying vegetation, as is aquatic fulmic acid, supra. Aquatic humic substances make up a significant fraction of the natural organic matter in water and are major precursors of disinfection by-products.

Hydroxyl Ion—generally a chemical ion comprising a free O− and H+, resulting from mixing a metal salt with hydrogen peroxide.

PAC—powder activated carbon composed of fine particles and providing a large surface area for adsorption. PAC is typically added as a slurry on an intermittent or continuous basis to remove taste/odor compounds or trace organic contaminants and is not reused.

Regenerate/Regeneration—a periodic restoration on an ion exchange resin back to a useable form by employing a regenerant to displace ions removed during the treatment process. In exchange resins are generated by reversing the exchange reaction between the exchanging ions and the ions that are removed during treatment and retained on the resin. The regenerant typically contains a high concentration of the exchanging ions to drive the exchange reaction in a reverse direction from the normal service cycle. This process is also called recharging or rejuvenation. This may also be defined and the removal of the adsorbed material from spent GAC, thus restoring the activated carbon's porous structure so it can be reused again. The regeneration process is similar to that used to activate carbon. This process is most frequently called reactivation.

Regeneration cycle—a sequence of steps, including backwash, application of regenerant, dilution, and fresh or deionized water rinsing required to regenerate an ion exchange bed or oxidizing filter.

Stratification—The formation of separate mixing layers in a body of water, usually characterized by different temperature regimes and usually called thermal stratification.

THMs—Trihalomethanes, a chemical group, which a derivatives of methane ($CH_4$) in which three halogen atoms (Cl, Br and I, singly or in combination) are substitutes for three of the hydrogen atoms. THMs are formed during the disinfection of water with free chlorine. Because of their carcinogenic potential and other negative health effects, THMs are regulated by the Environmental Protection Agency (EPA).

TOC—Total organic carbon which is a measurement of the concentration of organic carbon in water, determined by oxidation of the organic matter into carbon dioxide ($CO_2$). TOC includes all carbon atoms covalently bonded in organic molecules. Most of the organic carbon in drinking water supplies is DOC, with the remainder referred to as particulate organic carbon. In natural waters, TOC is composed primarily of nonspecific humic materials. TOC is used as a surrogate measurement for disinfection by-product precursors, although only a small fraction of the organic carbon will react to form these by-products. Quantitatively, TOC is determined by removing interfering inorganic carbon, such as bicarbonate, and oxidizing the organic carbon to carbon dioxide. Typically, carbon dioxide is then measured with a nondispersive infrared detector.

TON—Threshold odor number is a numerical value based upon the greatest dilution of a sample with odor-free water that yields a definitely perceptible odor. As example, if odor were perceptible in 1:1, 2:1 and 3:1 dilutions of a sample with odor-free water, but not in a 4:1 dilution, the threshold number would be 3.

Train theory—water treatment train.

Upflow Contact Clarifier—A unit that combines flocculation and settling in a tank. The flocculation portion of the tank is designed to provide the necessary mixing of good floc formation, while the sedimentation portion acts as a true upflow-type clarifier with the surface overflow rate controlling particle removal. As sludge or solids blanket is not involved. This is referred to as a basin contactor.

UV 254—Ultraviolet absorbency at 254 nanometers measures the amount of UV absorption at a wavelength 254 nm. This value is an indirect measure of compounds containing double bonds, including aromatic compounds. This measurement is representative of the humic content of natural organic matter and a surrogate for disinfection by-product precursors.

The above terms are given the above meanings and wherever there is a conflict between the given definitions and any other definition, the above definitions will be the proper context as used herein.

There has thus been outlined in a broad sense the more important features of the invention in order that the detailed description to follow may be better understood and in order that the present contribution and improvement to the art may be appreciated. Additional features of the invention will be disclosed in further detail and that subject matter as indicated in the claims below. While the invention is disclosed in its most preferred embodiments, it is to be understood that the language used herein is not intended to limit the scope of the invention to what is claimed, but also to any obvious derivative which would naturally occur in the development of the art. It is therefore important that the claims be regarded as including such equivalent constructions insofar as they do not depart from the spirit and scope of the present invention.

It is the objective of the present invention to provide a new and improved water treatment system and method and/or process of utilizing the same which may be easily adapted to present water treatment systems and employing steps and materials already by the governing regulatory agencies. It is also the primary intent to introduce these improvements to enhance low cost operation of the systems and low cost of implementation.

Another objective is to provide the process to improve the prior art and reduce the detrimental aspects of the prior art while providing better water the consumer at or near the present cost of delivery of less desirable water while using less harmful chemical and less chemical quantity.

Yet another objective is to provide the treated water with less amounts of DBPs, microorganisms, organic compounds, halomethanes, haloacetic acids, unpleasant taste and odor, mineral iron and manganese.

These, together with the other objectives of the invention pare pointed out particularly within the claims included within the application. For better understanding of the invention, its operational advantages and specific benefits obtained by its use, reference is directed to the drawings, further specification and claims, along with other descriptive matter, including test results and illustrations of use incorporated within the remainder of the application.

III. DESCRIPTION OF THE DRAWINGS

The following drawings are submitted with this utility patent application.

FIG. 6 is a second phasic overview of FIG. 5 of the water treatment system and method prior to filtration.

FIG. 7 is a time relative chart of a detention graphical comparison resulting from the use of the water treatment system and method.

FIG. 8 is a graphical representation of data resulting from the use of an iron catalyst in the water treatment system and method by percent reduction from a four minute detent period.

IV. DESCRIPTION OF THE PREFERRED EMBODIMENT

Figure 1:
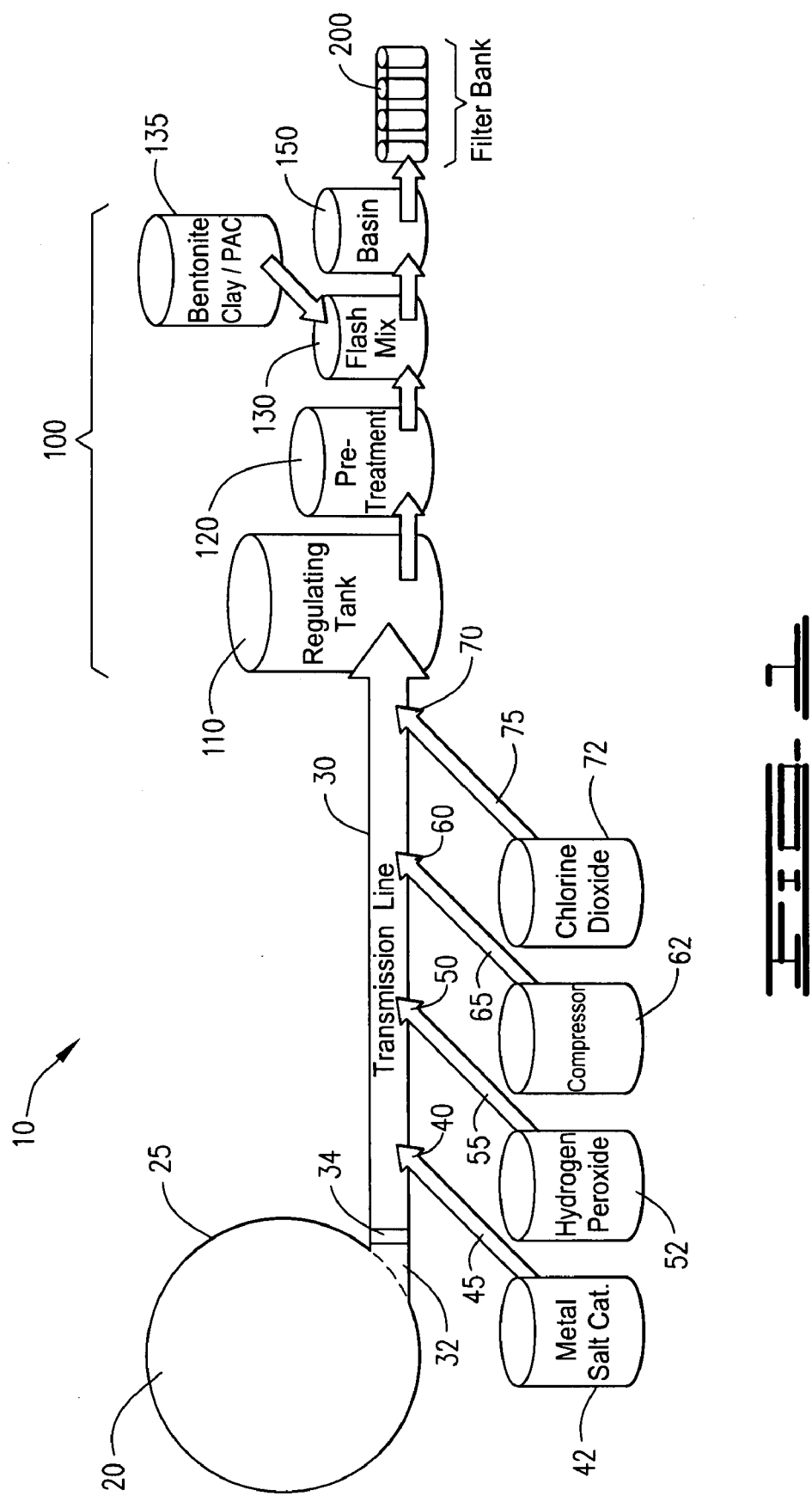
FIG. 1 is a general overview flowchart of a first embodiment of the water treatment system and method.

A train process system and method 10 for a water treatment system to remove organic materials from water 20 from a water source 25 in a phasic and systematic manner, shown in FIGS. 1-6 of the drawings, and applied to a water treatment system comprises a series of steps commencing with the introduction of the untreated water 20 from the water source 25 by a water pump 32 through an inlet valve 34 into a transmission line 30 having a plurality of injection ports 40, 50, 60, 70 along the transmission line 30 for the introduction of a reactive metal salt catalyst from a first reservoir 42, hydrogen peroxide from a second reservoir 52, air from an air compressor 62 to enhance mixing and aeration within the transmission line 30 for mixing water 20 from the water source 25 within the transmission line 30, and a disinfectant from a fourth reservoir 72, such as chlorine dioxide, forming a water mixture prior to delivery of the water mixture to a detention tank battery 100, having at least a flash mix tank 130, wherein the water mixture is reserved within the flash mix tank 130 where bentonite clay or powder activated carbon (PAC) 135 is added prior to introduction into a contactor basin 150 within the detention tank battery 100 and finally sent to a filter battery 200 having at least one filter column at one or more levels to remove any contaminants or by-products from the water mixture, thus providing clean, filtered, odor and color free potable water. This method eliminates organic materials and potential carcinogens in a feasible, economic and controllable manner by adjusting the quantity of chemicals added, altering detention times during each stage of the method and system, and to expedite the method from the water source to the production of the potable water for delivery to the consumer or customer.

The raw water may be pre-treated with chlorine, or pre-chlorinated, prior to or at the inlet valve 34, by the introduction of chlorine dioxide to disinfect the raw water at 1.3 parts per million, or by mixing sodium chlorite at 25% strength with chlorine gas in an on-site generator to obtain a chlorine dioxide residual of 1.0 parts per million upstream from the water pump. This should be away from the location where hydrogen peroxide is injected to avoid removal of the chlorine dioxide addition too quickly.

Figure 2:
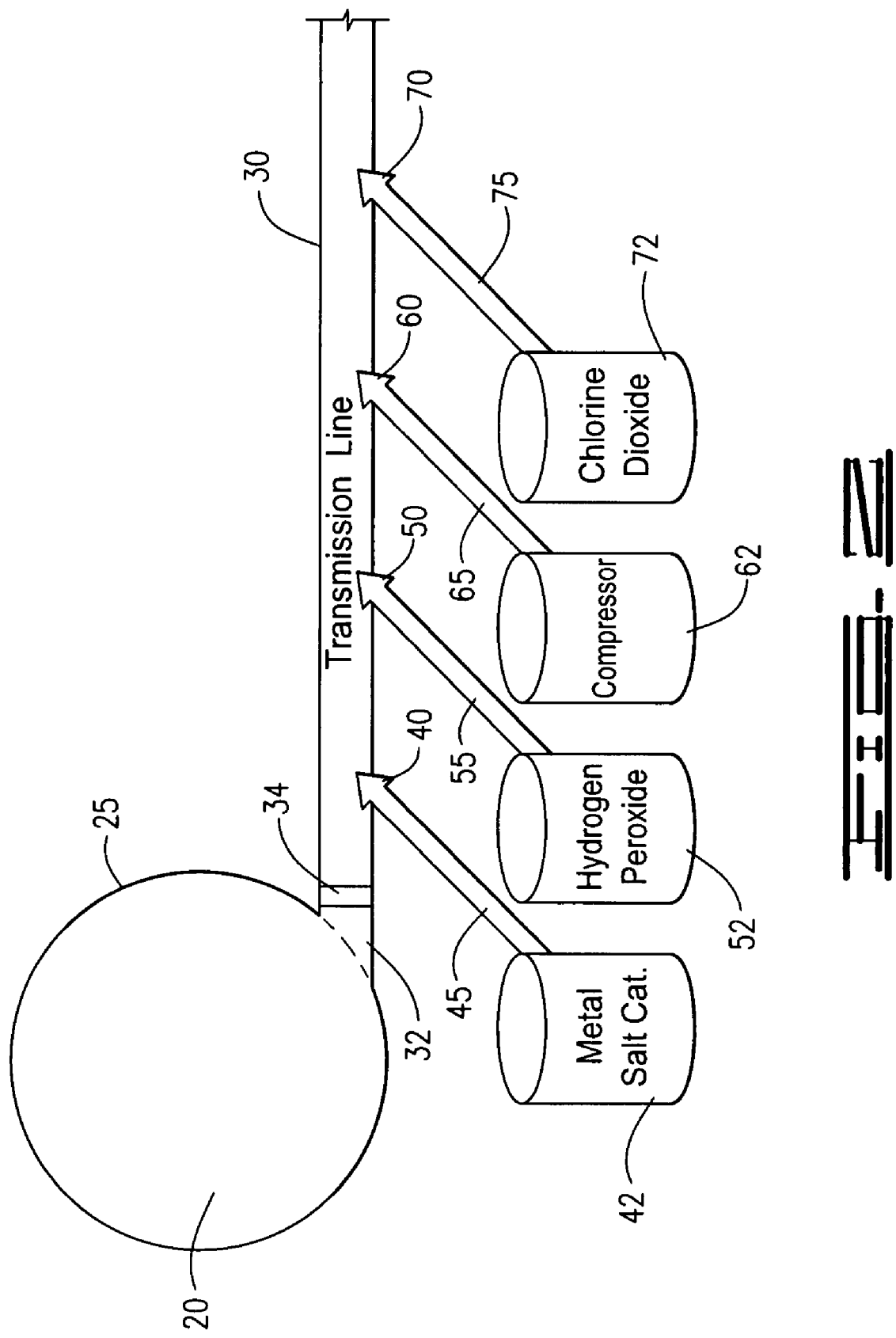
FIG. 2 is a first phasic overview of FIGS. 1, 3 and 6 of the water treatment system and method.

The primary transmission line 30 would therefore have a plurality of injections points 40, 50, 60, 70, along the transmission line 30, FIG. 2, each injection point connecting to a respective reservoir 42, 52, 72, by an independent injection line 45, 55, 75. A first injection point 40 would provide a concentrated metal salt catalyst to the transmission line 30 from a first reservoir 42 through a first injection line 45, such metal salt catalyst most preferably ferric sulfate or ferric chloride of a 50-60% concentration in a desired parts per million basis, dictated by the content of the water source. The metal salt catalyst may be aluminum, iron, magnesium or manganese, but it is preferred that it be either ferric sulfate or ferric chloride. The metal catalyst salt is provided as a catalyst, coagulant and to provide the required valence transfer in the treatment system and method.

A second injection point 50 would provide a concentration of hydrogen peroxide from a second reservoir 52 through a second injection line 55 located at least three inches or more from the first injection point 40, hydrogen peroxide delivered at 35-50% concentration at a feed rate dictated by the content of the water source. Hydrogen peroxide, in the presence of the metal catalyst salt, produces hydroxyl ions or hydroxyl free radicals to remove turbidity, and to serve as an oxidant for organic contaminants, reducing these contaminants to ash and to eliminate disinfectant byproduct formation in the presence of chlorine. Detention time of the water treated by the metal salt catalyst and the hydrogen peroxide may be as long as five hours, but may be shorter depending on the amount of organic materials, iron and manganese, as well as other contaminants contained within the water source. The combination of hydrogen peroxide and metal salt results in the production of hydroxyl ions, oxygen, hydrogen and provides the necessary valence transfer necessary to advance the treatment system and method and to reduce the organic contaminants in the treated water.

A third injection point 60 is provided for the injection of air through a third injection line 65 from an air compressor 62 to create a turbulence for aeration of the water within the transmission line 30 to provide for an enhanced hydroxyl formation. Again, the amount of air injected is dependant on the needs of the water source. If sufficient turbulence exists in the transmission line 30, it may be unnecessary to add the air. A fourth injection point 70 provides chlorine dioxide, a disinfectant, to the transmission line 30 through a fourth injection line 75 from a fourth reservoir 72 to reduce and remove any excess hydrogen peroxide and to further disinfect the water within the transmission line 30. This fourth injection point 70 may be introduced prior the first injection point 40, depending on the water 20 in the water source 25.

The metal salt and hydrogen peroxide further assist the organic removal by sorbing three main classes of contaminants including inorganic cations, inorganic ions and non-polar organic materials. Sorption of nitrates, chromate, chlorinated solvents and fuel components are commonly affected by this organic catalyst addition along with the other ongoing chemical processes occurring in the system and method 10. The water mixture, including all the additives which have been applied to the water passing within the transmission line 30, is then transferred to the tank battery 100 for further detention to retain the water until sufficient detention has occurred to decontaminate and allow the chemical process to fully occur and until transferred to the filter bank 200. The detention tank battery 100 generally may comprise a regulating tank 110, a pretreatment tank 120, the flash mix tank 130 and the basin contactor 150. The process of oxidation of the organics by the hydrogen peroxide and coagulation of the organics by the metal salt catalyst, or ferric sulfate, produces a more dense blanket of compact residual sludge giving lower NTU readings.

Figure 3:
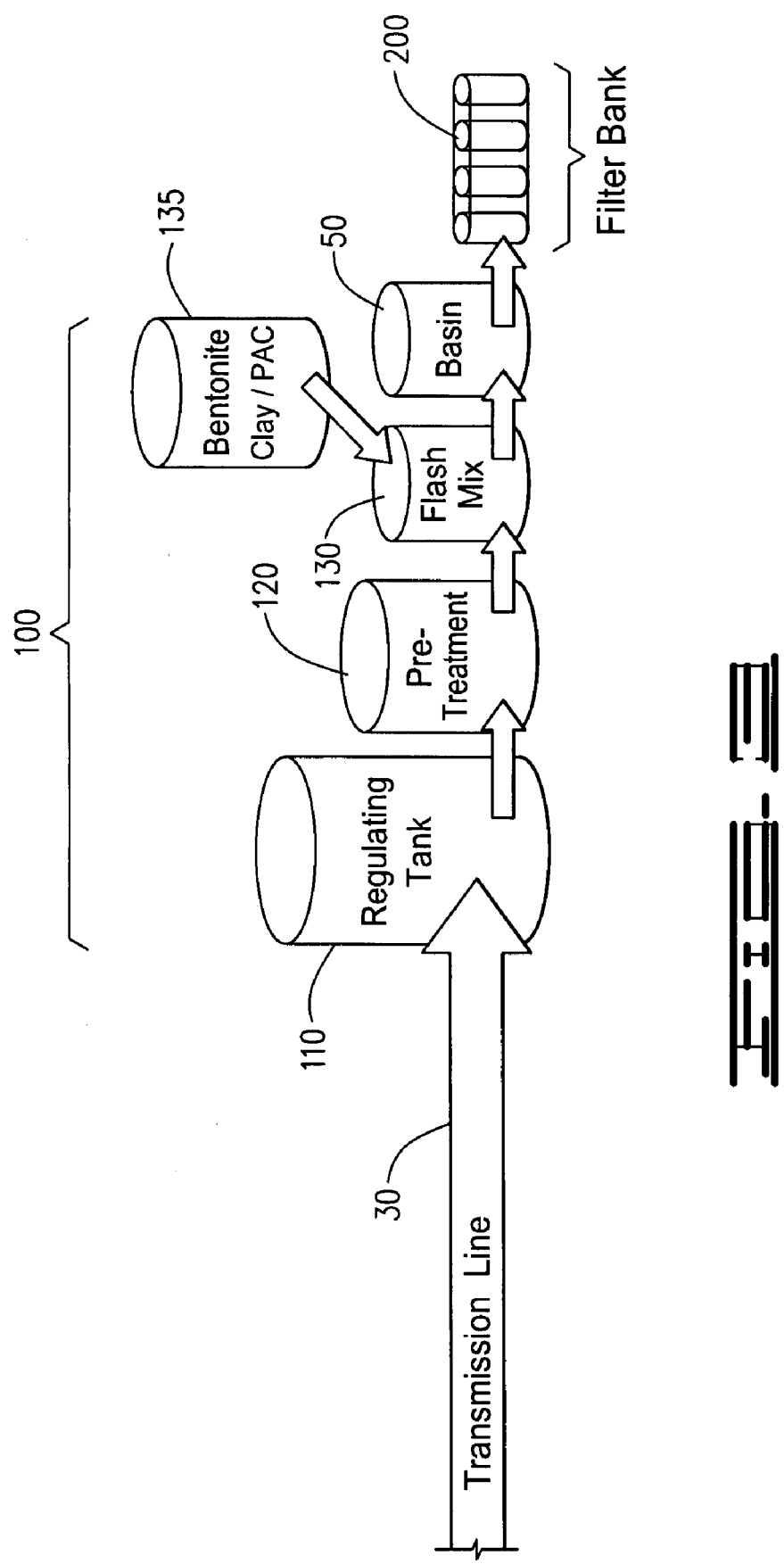
FIG. 3 is a second phasic overview of FIG. 1 of the water treatment system and method.
Figure 4:
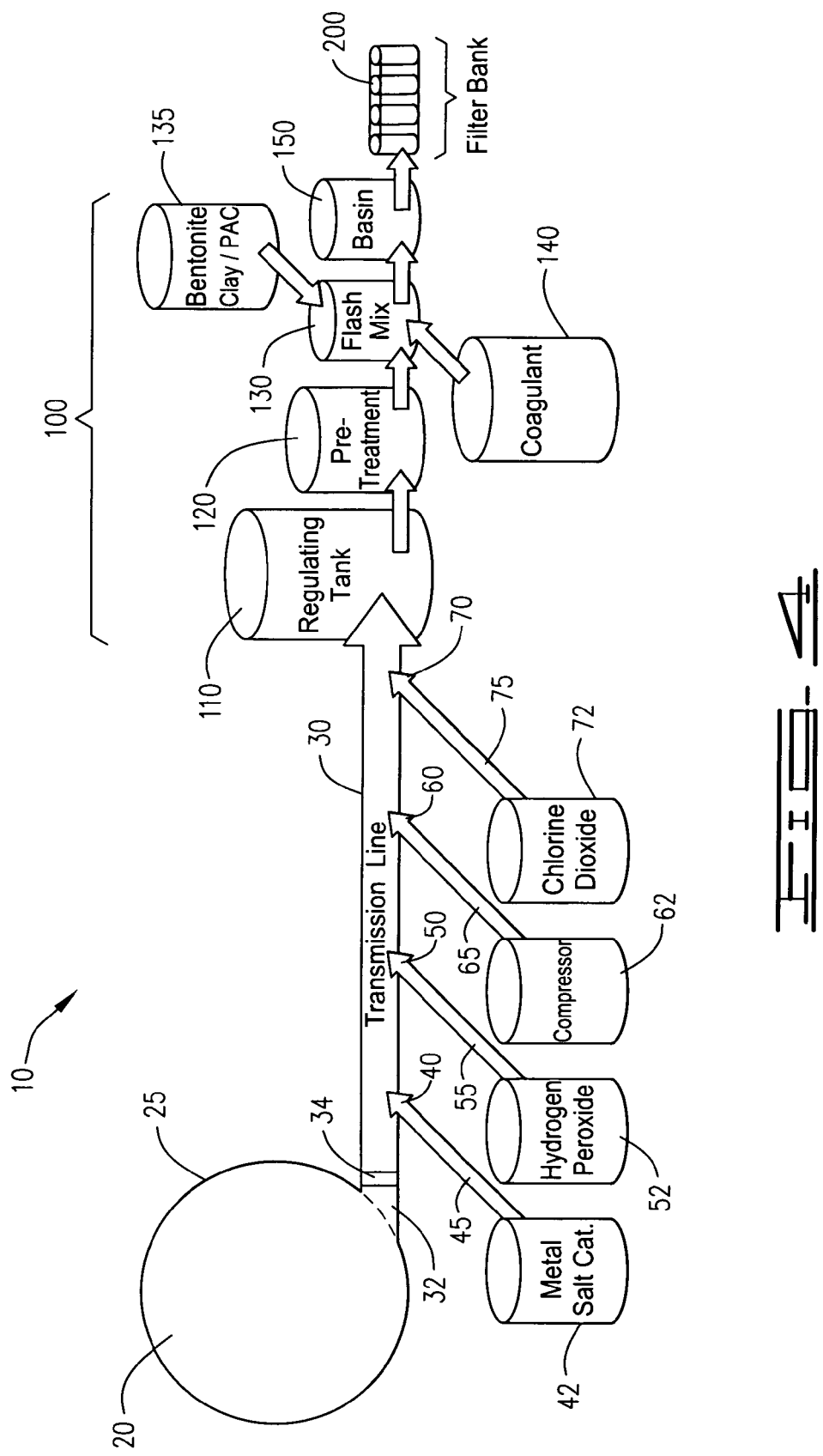
FIG. 4 is a general overview flowchart of a second embodiment of the water treatment system and method with the addition of a polymer.

A coagulant reservoir 140 may also transfers a cationic, anionic and/or ionic coagulant, or any combination thereof to the flash mix tank 130 to coagulate any excess ash product or turbidity, FIGS. 3-4. The coagulant may be an iron salt such as ferric sulfate or ferric chloride, alum, or ACH (aluminum chlorohydrate) which are transferred from the coagulant reservoir 140 to the tank battery 100, preferably the flash mix tank 130. A portion of NSF approval rated Bentonite clay is also added from a Bentonite clay/PAC reservoir 135 to the tank battery 100, preferably the flash mix tank 130, to remove light organic materials and clear the water prior to filtration. The water is then transferred to the basin contactor 150 where it is retained until passed to the filter banks 200 containing the at least one filter column. The water should be in potable form after passing through the filters and suitable for deliver for safe human consumption.

The filter banks 200 may be GAC filters which aid in the system and method 10 by capturing any organic radicals from the treated water and subsequent to back washing, removing any organic trash left behind from the chemical processes occurring throughout the system and method. The organic catalyst may also be used within the filters as a filter media or applied as a fine powder. It may also be introduced within the flash mix tank 130 to enhance TOC removal and also to remove nitrates, phosphates, radionucleotides, pesticides, petroleum products and by-products, mercury, gaseous contaminants, heavy metals and most other contaminants which can be found in raw water supplies.

Figure 5:
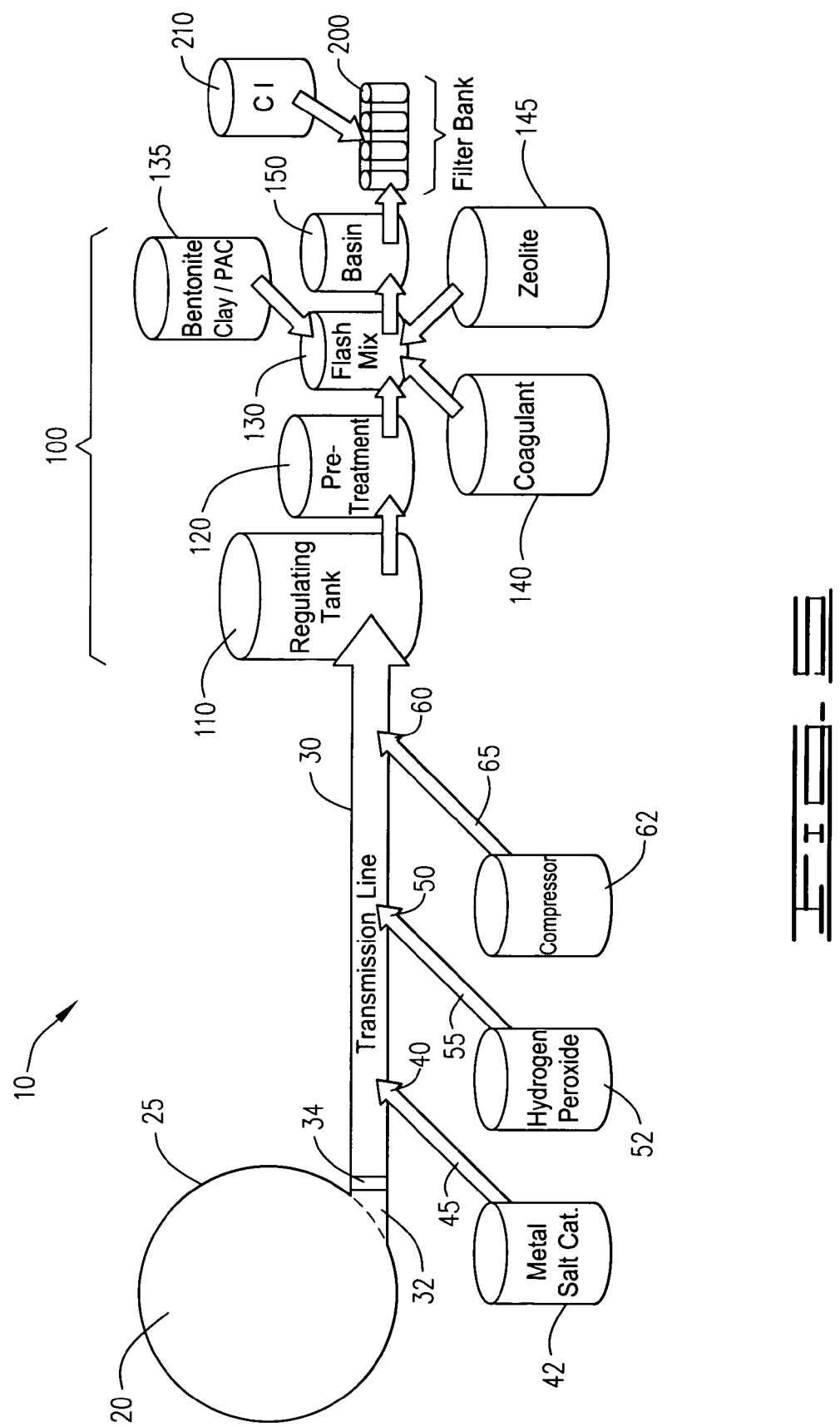
FIG. 5 is a general overview flowchart of a third embodiment of the water treatment system and method with the addition of a polymer and an inorganic catalyst.
Figure 5:
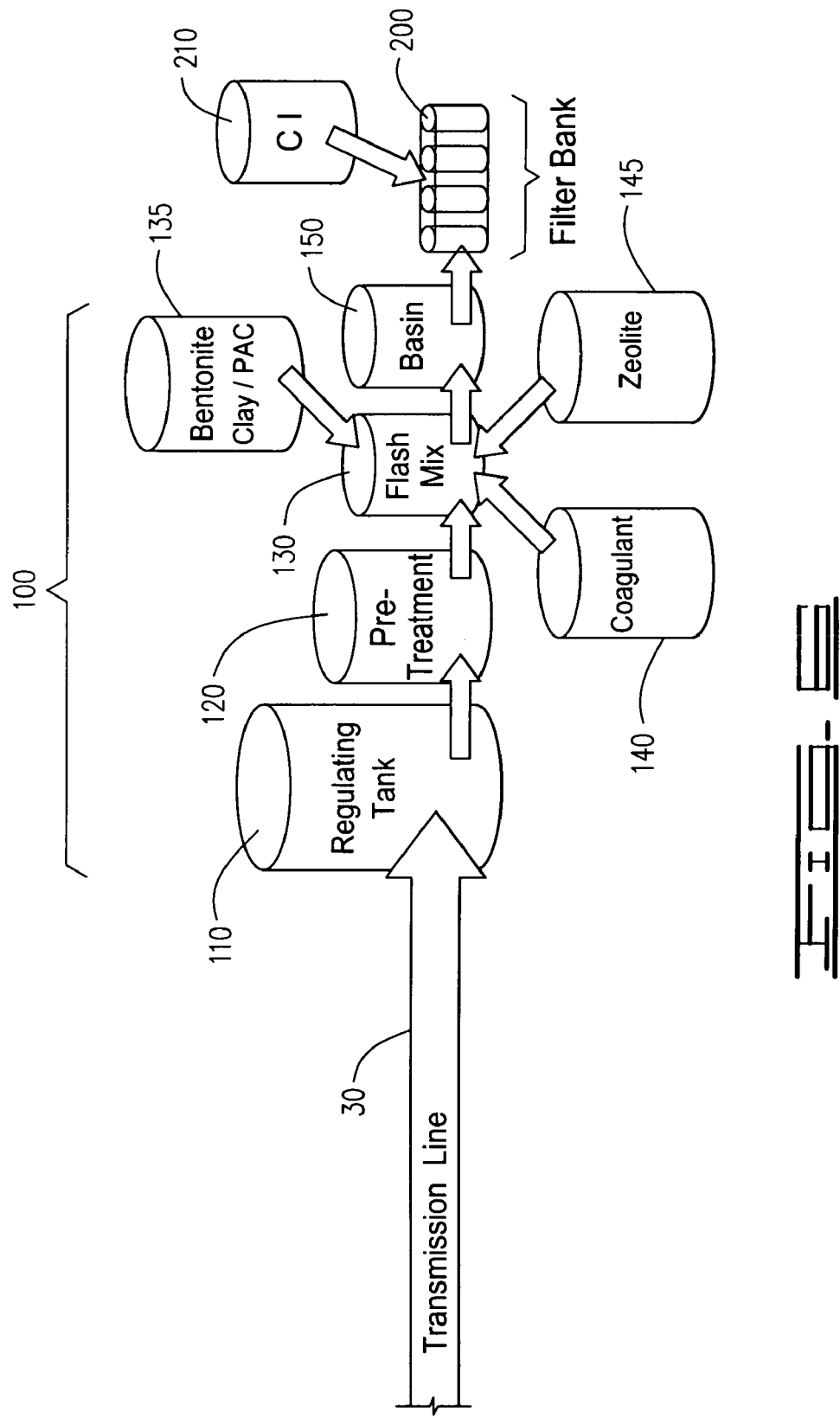

An inorganic catalyst, in the form of a natural zeolite or a synthetic zeolite may also be added into the tank battery 100, preferably the flash mix tank 130 from an inorganic catalyst reservoir 145, to increase the reactivity of the metal catalyst and hydrogen peroxide and to reduce detention time within the system, FIGS. 5-6. At the flash mix tank 130, the chemical processes should be occurring from the injection additions along the transmission line 30 and tank battery 100. The inorganic catalyst from the inorganic catalyst reservoir 145, is preferably a natural zeolite, but most preferably chabazite. This inorganic catalyst would have on site cations including calcium, sodium, potassium, aluminum and iron which will exchange with other elemental contaminants or organics from numerous substrates making it multi-functional and works well within a pH range of 3 to 13. With the addition of additional acids, it will also lower pH to enhance coagulation.

Figure 9:
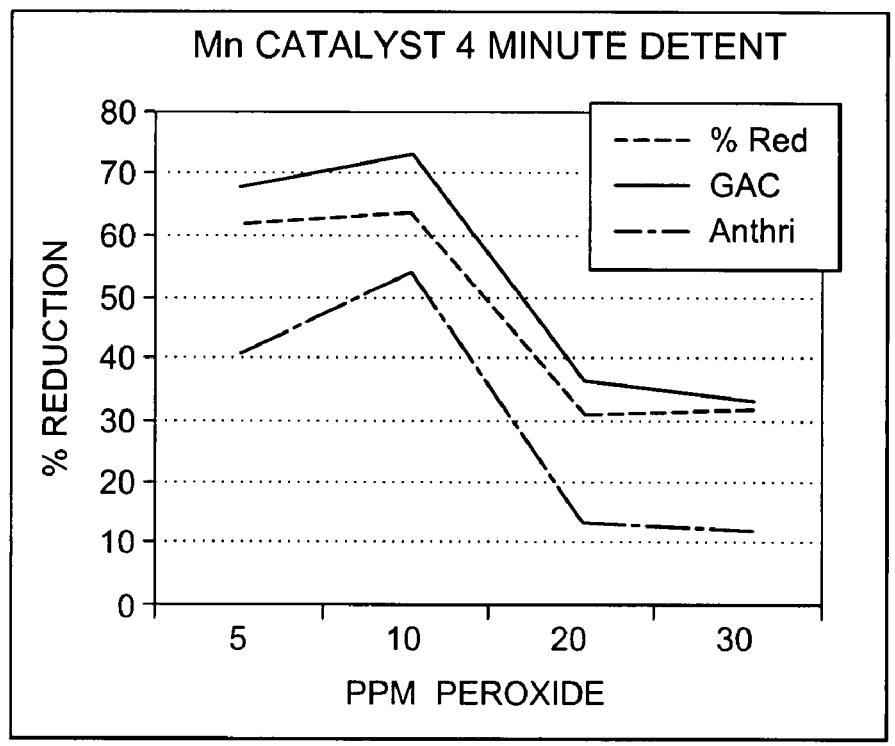
FIG. 9 is a graphical representation of data resulting from the use of a manganese catalyst in the water treatment system and method by percent reduction from a four minute detent period.
Figure 10:
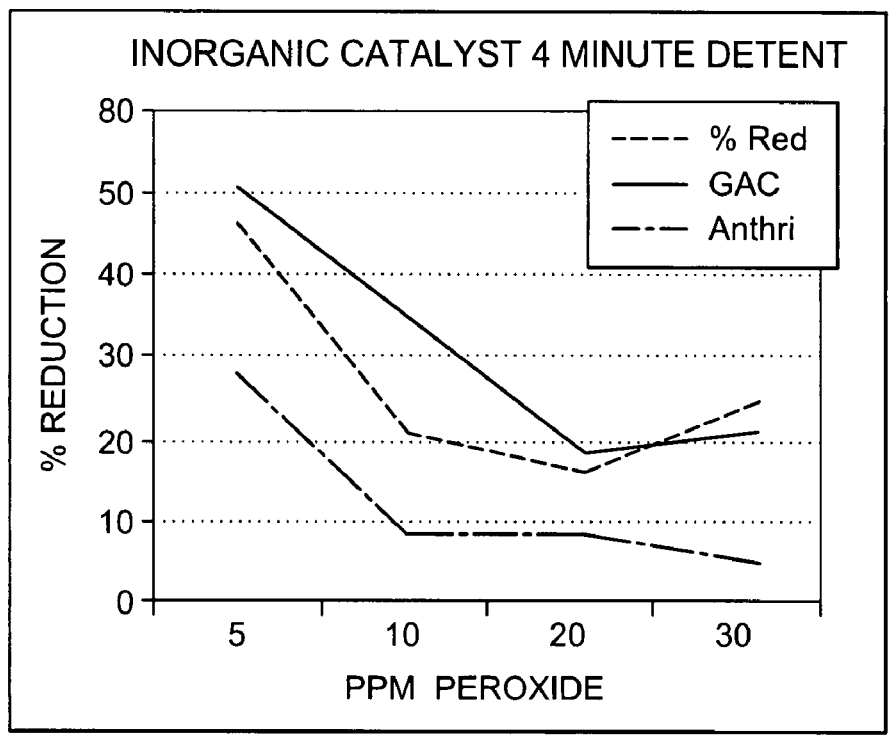
FIG. 10 is a graphical representation of data resulting from the use of an inorganic catalyst in the water treatment system and method by percent reduction from a four minute detent period.

The inorganic catalyst is provided to promote hydroxyl formation from the hydrogen peroxide and to shorten the detention time, FIG. 7, of the iron catalyst salt and hydrogen peroxide reactions to as little as 2-4 minutes. This reaction takes place as the ferric sulfate, ferric chloride, or metal salt catalysts, and the hydrogen peroxide water mixture interact for form hydroxyl radicals, converting to oxygen, further attack and neutralize organic structures in water rendering them inert organic by-products, FIGS. 8-10. Also involved in these reactions are hydrogen which also assists the breakdown of organic compounds by creating the requisite valence transfers. This also slightly raises the pH or alkalinity of the water and will function in a wide range varied pH, from 3-12, although a pH of 7 is optimal for the reactions to properly occur at a low detention rate. This also boosts the TOC due to chain cleavage of some of the organic compounds.

To assist in this conclusion of chemical process where the inorganic catalyst or zeolite is added, chlorine from a chlorine reservoir 210 may be introduced prior to the filter bank or imbedded within the filter bank, which will inhibit the metal salt catalyst and the hydrogen peroxide activity. This addition prior to the filter bank will also condense a residual sludge blanket forming a tight sieve and lower turbidity within the basin contactor 150 before transmission to the filter bank 200. There should be no addition of chlorine dioxide to the transmission line 30 where the inorganic catalyst or zeolite is added to the treatment system and method 10, as indicated in FIGS. 5 and 6. The resulting system and method should also remove endocrine disruptors, acids, human waste hormones, and pharmaceutical by-products.

It is further contemplated that multiple systems of water treatment may be used with the disclosed system and method and that no specific limitation should be inferred from the examples given in the drawings figures and the above general disclosure. It is also not intended that any limitation be placed on the pretreatment of water prior to entry into the transmission line 30, and that any pretreatment would not effect the system and method, other than to possible reduce the amount of treatment and length of detention time of the disclosed system and method. Flow valves may also be employed within the system to regulate the flow of water through the system, not shown. In addition, any accrued ash or sludge may be removed from the water prior to introduction into the system and method by a vacuum system or a sludge blow off system.

The water may also undergo other conventional water treatment processes, either within the system and method or subsequent to the present system and method. These known processes include desalination, sedimentation, filtration, clarification, disinfection, softening, or aeration. Treatment of the water with subsequent chlorine or fluoride is also cooperative and complimentary to the system and method.

The injection points 40, 50, 60, 70 along the transmission line 30 and into the tank battery 100 may be accomplished by several known technologies, including venturi, high pressure nozzle injection nozzles, upstream injection or the like. Alternatively, the inorganic catalyst could also be introduced into the flash mix tank 130 without serious effect upon the chemical treatment process. The chemicals added at the injections points will be effective, provided that adequate mixing occurs along the transmission line 30 and through to the filter bank 200. It is also advised that responsible addition of the chemical under strict scrutiny be employed and kept within the realm of responsibility, understanding that overfeeding of hydrogen peroxide may require removal of excess through means including a disinfectant enhancer such as chlorine, chlorine dioxide, UV treatment, ozone treatment or through the addition of potassium permanganate. Constant regulation and monitoring of the water system and method with systemic review should prevent any over treatment, with the chemical processes and quantities monitored at all points along the water treatment system.

While disclosing the method and system for application to a potable water supply, it is contemplated within the scope of the invention that the system and method may also be applied to industrial waste, refuse water from waste treatment plants, ground water, surface water and any other application desiring cleanup of organic contaminants.

In support of the novelty and resultant success of the disclosed system and method, the following test results are shown as follows.

Study 1

A study was conducted during the inventive process to determine a suitable organic hard catalyst to be used in the development of the water treatment system and process disclosed herein. There were three main criteria reviewed in locating the most suitable catalyst including, but not limited to: a) effectiveness of hydroxyl formation in the process; 2) shortening of the process detention time; and 3) economic feasibility.

The catalyst must possess physical chemical properties including non-intrusiveness to water and must no leach from the applied valence contributors. A variety of inorganic zeolites differing in size and character were evaluated with different impregnated quaternary amines and thermal activation properties. Characteristics needed for selection included TOC removal rate, form of DOC affected, pH, alkalinity, residual hydrogen peroxide at different detention rates, THMs, HAAs, and UV 254. Taste and odor removal were relevant as were iron and manganese levels in the final water product.

A predetermined application rate of hydrogen peroxide was implemented for each testing of the samples of impregnated zeolite. Concerns for catalyst life span, and regeneration of the usable zeolite were relevant and reviewed data. It was also important to review the catalyst's performance not only as a catalyst for other chemical process involved in the treatment process, but also as an additional oxidizer and filtration media. Within these parameters, recommendations would be made as to the feasibility of the catalyst.

The insertion point for the inorganic catalyst would be in an existing pilot plant flash mixer and/or pretreatment basin constructed for the project, generally represented in FIGS. 5 and 6 of the drawings. The flash mixer has a detention time of 4 minutes, depending of the positioning of the influent flow, while the pretreatment basin behind will have a detention time of 40 minutes. This adjustment will not involve detention within the regulating tank with application of the raw water straight into the flash mixer with the catalyst in the bottom unit. In second testing, the back half of the pretreatment basin only is used for the 40 minute detention time. Hydrogen peroxide was added at the flash mixer allowing immediate contact with the catalyst. The polymer was added as an effluent from the flash mixer before the water flows into the contact basin where chlorine will be added by injection. After the flow leaves the contact basin, it will be filtered by a GAC filter and anthracite.

A third party testing laboratory was hired to run the following tests on three of the catalysts for THMs, potassium, HAAs, sodium, UV 254, iron, TOC, copper, TON, sludge volume, manganese and turbidity. The experimental procedures of the study included an evaluation of the ability of the hard catalyst to shorten the detention time, evaluate the TOC removal percentage and determine what portion of the DOC are effectively reduced and evaluate the life span and regeneration ability of the hard catalyst and find what residual is left after the inorganic catalyst contact, which would reveal what capability the tested catalyst has to form hydroxyl ions. Some other results we will be interested in as a result of this project include media layering, regeneration and parts per million of the regenerated chemicals and how they fit the treatment theory.

The source water for the research is of high DOC in the unsorbable range with occurrences of spiking in the humic range due to algae blooms in the lake at different periods during the year, correlating with weather conditions. A basic zeolite catalyst was modified by the applications of varying carrier bearing surfactants. Chabazite was a suitable zeolite. The raw water was treated with known concentrations of hydrogen peroxide in front of the flash mixer and the pilot plant was configured to yield a detention time of 4 minutes. The raw water was then subjected to the normal treatment of polymer addition, flocculation and coagulation, chlorination and filtration. The filters were made up of GAC and anthracite from which the TOC samples were taken individually and then as a composite for a total finish reading.

In every test, the GAC filter performed better than the anthracite filter. Some residual hydrogen peroxide was passed through the catalyst by was in small amounts. After evaluating the analytical results, the catalyst with the best conversion of hydroxyl ions in conjunction with the hydrogen peroxide yielded the lowest residuals of hydrogen peroxides in the tests. Higher residuals of hydrogen peroxide gave lower percent removal of TOC. A finish water sample was tested by means of an atomic absorption unit and revealed a reduction in iron, manganese and arsenic while sodium and potassium levels were elevated in minimal amounts. TOC levels were reduced from the low 30% to the mid 70%.

The metal salt catalyst showed that regeneration can continuous, involving iron sulfate or chloride. Intermittent regeneration with potassium permanganate, an oxidant and disinfectant, was not performed. Catalysts were run until 23,400 bed loads of water had passed through them, at which time a water analysis was taken and sent to a certified lab to determine the level of TOC being removed and to compare the site TOC analyzer reading for accuracy. These readings also rendered a base line to see what affect the addition of a regeneration chemical would do. The ferric sulfate was then applied prior the hydrogen peroxide at 5 ppm increments while holding the hydrogen peroxide at a constant feed. In test number one, 20 ppm was the constant feed of hydrogen peroxide, and in test two, it was at 30 ppm. The ferric sulfate-hydrogen peroxide mixture was passed through the inorganic catalyst at a detention time of 4 minutes. Backwashing was conducted after filtration as the organic collected in and on the catalyst to enhance the cost and time effectiveness. Regeneration of the metal salt catalyst and the organic catalyst were both realized and these catalyst were suitable for reuse in the system for an undetermined number of times when recaptured during the backwash process.

Test Conclusions

Conclusions reached as a result of this testing demonstrate that the inorganic catalysts, polymers, metal salt catalysts and hydrogen peroxide used were easily applied to existing water treatment systems, with the required modifications economically feasible, efficient, provides for regeneration for continuous ling-term use. This may be applied at several points along the water treatment system and provide a more economical solution to the removal of TOCs, disinfection by-products, toxins, iron and manganese, with other substances revealed in other testing or use, depending on the water source.

Given proper formulation and application, the inorganic catalyst is efficient at removing TOC in all regions of the DOC without the formation of disinfection by-products. It will produce hydroxyl ions and yield negligible hydrogen peroxide residual. It is an oxidizer, has the ability to adsorb radicals, and can substitute for radicals. It significantly reduces the detention time needed from the liquid-liquid phase of five hours to a range of 4-40 minutes, which results in tighter security of the chemicals and water production process with a greater output of potable clean water.

As the claimed system and methods and disclosures of the specification, it is noted that changes may be made in the combinations, operations, order and arrangements of the various parts and elements described herein without departing from the spirit and scope of the invention. Furthermore, names, title, headings and general division of the aforementioned are provided for convenience and should not be considered limiting. While the invention has been particularly shown and described with reference to a preferred embodiment thereof, it will be understood by those skilled in the art that changes in form and detail may be made therein without departing from the spirit and scope of the invention.

What is claimed is:

1. A water treatment method for the treatment of water for safe human consumption, applied to a water treatment system obtaining water from a water source by a pump directing said water through an inlet valve of a transmission line to a tank battery and a filter bank having at least one filter column, said water treatment system comprising the steps of:

adding a metal salt catalyst at a first injection point in said transmission line from a first reservoir through a first injection line;

adding hydrogen peroxide at a second injection point in said transmission line from a second reservoir through a second injection line, wherein said hydrogen peroxide and metal salt form hydroxyl ions, free radical oxygen, hydrogen and supply valence transfer to reduce any organic contaminants in said water to inert substances;

adding air, if necessary, at a third injection point in said transmission line from an air compressor through a third injection line;

adding a disinfectant at a fourth injection point in said transmission line from a fourth reservoir through a fourth injection line to remove excess hydrogen peroxide remaining after the chemical reaction between said metal salt catalyst and hydrogen peroxide;

transferring contents of said transmission line to a detention tank battery, having at least a flash mix tank, for detention of said water for a period of up to five hours;

adding Bentonite clay and powder activated carbon to said flash mix tank forming a residual sludge blanket, to remove small organic contaminants and to clear said water; and passing said water from said detention tank battery to said filter bank having said at least one filter column for further delivery for human consumption and use.

2. The water treatment method as disclosed in claim 1, wherein said metal salt catalyst is selected from a group of metal comprising aluminum, iron, magnesium or manganese.

3. The water treatment method as disclosed in claim 1, wherein said disinfectant at said fourth injection point is chlorine dioxide.

4. The water treatment method as disclosed in claim 1, wherein said metal salt catalyst
is ferric sulfate or ferric chloride in a 50-60% concentration and said disinfectant is chlorine dioxide.

5. A water treatment method for the treatment of water for safe human consumption, applied to a water treatment system obtaining water from a water source by a pump directing said water through an inlet valve of a transmission line to a tank battery and a filter bank having at least one filter column, said water treatment system comprising the steps of:

adding a metal salt catalyst at a first injection point in said transmission line from a first reservoir through a first injection line;

adding hydrogen peroxide at a second injection point in said transmission line from a second reservoir through a second injection line, wherein said hydrogen peroxide and metal salt form hydroxyl ions, free radical oxygen, hydrogen and supply valence transfer to reduce any organic contaminants in said water to inert substances;

adding air, if necessary, at a third injection point in said transmission line from an air compressor through a third injection line;

adding a disinfectant at a fourth injection point in said transmission line from a fourth reservoir through a fourth injection line to remove excess hydrogen peroxide remaining after the chemical reaction between said metal salt catalyst and hydrogen peroxide;

transferring contents of said transmission line to a detention tank battery, having at least a flash mix tank, for detention of said water for a period of up to five hours;

adding Bentonite clay and powder activated carbon to said flash mix tank forming a residual sludge blanket, to remove small organic contaminants and to clear said water;

adding a coagulant, comprising a cationic, anionic or ionic coagulant, or a mixture of said coagulant, to said flash mix tank to coagulate any excess ash product or turbidity; and transferring said water from said detention tank battery to said filter bank having said at least one filter column for further delivery for human consumption and use.

6. The water treatment method as disclosed in claim 5, wherein said metal salt catalyst is selected from a group of metal comprising aluminum, iron, magnesium or manganese.

7. The water treatment method as disclosed in claim 5, wherein said disinfectant at said fourth injection point is chlorine dioxide.

8. The water treatment method as disclosed in claim 5, wherein said coagulant is selected from a group comprising ferric sulfate, ferric chloride, alum, or aluminum chlorohydrate, and is provided to coagulate any excess ash product or turbidity prior to filtration.

9. The water treatment method as disclosed in claim 5, wherein:
said metal salt catalyst is ferric sulfate or ferric chloride in a 50-60% concentration;
said disinfectant is chlorine dioxide; and
said coagulant is selected from a group comprising ferric sulfate, ferric chloride, alum, or aluminum chlorohydrate, and is provided to coagulate any excess ash product or turbidity prior to filtration.

10. A water treatment method for the treatment of water for safe human consumption, applied to a water treatment system obtaining water from a water source by a pump directing said water through an inlet valve of a transmission line to a tank battery and a filter bank having at least one filter column, said water treatment system comprising the steps of:

adding a metal salt catalyst at a first injection point in said transmission line from a first reservoir through a first injection line;

adding hydrogen peroxide at a second injection point in said transmission line from a second reservoir through a second injection line, wherein said hydrogen peroxide and metal salt form hydroxyl ions, free radical oxygen, hydrogen and supply valence transfer to reduce any organic contaminants in said water to inert substances;

adding air, if necessary, at a third injection point in said transmission line from an air compressor through a third injection line;

transferring contents of said transmission line to a detention tank battery, having at least a flash mix tank, for detention of said water;

adding a zeolite, catalyst, to said flash tank for detention within said flash mix tank for a period of two to forty minutes, to expedite and enhance chemical reactions of said metal salt and hydrogen peroxide and to enhance reduction of organic contaminants in said water;

adding Bentonite clay and powder activated carbon to said flash mix tank forming a residual sludge blanket, to remove small organic contaminants and to clear said water;

adding a coagulant, comprising a cationic, anionic or ionic polymer, or a mixture of said coagulants, to said flash mix tank to coagulate any excess ash product or turbidity;

transferring said water from said detention tank battery to said filter bank having said at least one filter column; and adding a disinfectant chlorine to said filter bank to eliminate any remaining hydrogen peroxide residual in said water and to further clarify said water upon delivery of said water for human consumption and use.

11. The water treatment method as disclosed in claim 10, wherein said metal salt catalyst is selected from a group of metal comprising aluminum, iron, magnesium or manganese.

12. The water treatment method as disclosed in claim 10, wherein said coagulant is selected from a group comprising ferric sulfate, ferric chloride, alum, or aluminum chlorohydrate, and is provided to coagulate any excess ash product or turbidity prior to filtration.

13. The water treatment method as disclosed in claim 10, wherein said zeolite is chabazite.

14. The water treatment method as disclosed in claim 10, wherein said zeolite is chabazite and has on site cations including calcium, sodium, potassium, aluminum and iron which will exchange with other elemental contaminants or organics from numerous substrates making it multi-functional and works well within a pH range of 3 to 13, and with the addition of additional acids, will also lower pH to enhance coagulation.

15. The water treatment method as disclosed in claim 10, wherein:
   said metal salt catalyst is ferric sulfate or ferric chloride in a 50-60% concentration;
   said disinfectant is chlorine dioxide; and
   said coagulant is selected from a group comprising ferric sulfate, alum, an amine, or aluminum chlorohydrate, and is provided to coagulate any excess ash product or turbidity prior to filtration.

16. The water treatment method as disclosed in claim 10, wherein:
   said metal salt catalyst is ferric sulfate or ferric chloride in a 50-60% concentration;
   said disinfectant is chlorine dioxide;
   said coagulant is selected from a group comprising ferric sulfate, alum, an amine, or aluminum chlorohydrate, and is provided to coagulate any excess ash product or turbidity prior to filtration; and
   said zeolite is chabazite and has on site cations including calcium, sodium, potassium, aluminum and iron which will exchange with other elemental contaminants or organics from numerous substrates making it multi-functional and works well within a pH range of 3 to 13, and with the addition of additional acids, will also lower pH to enhance coagulation.

* * * * *